July 24, 1928.
E. POKORNY
EVAPORATING APPARATUS
Filed Jan. 4, 1927
1,677,987
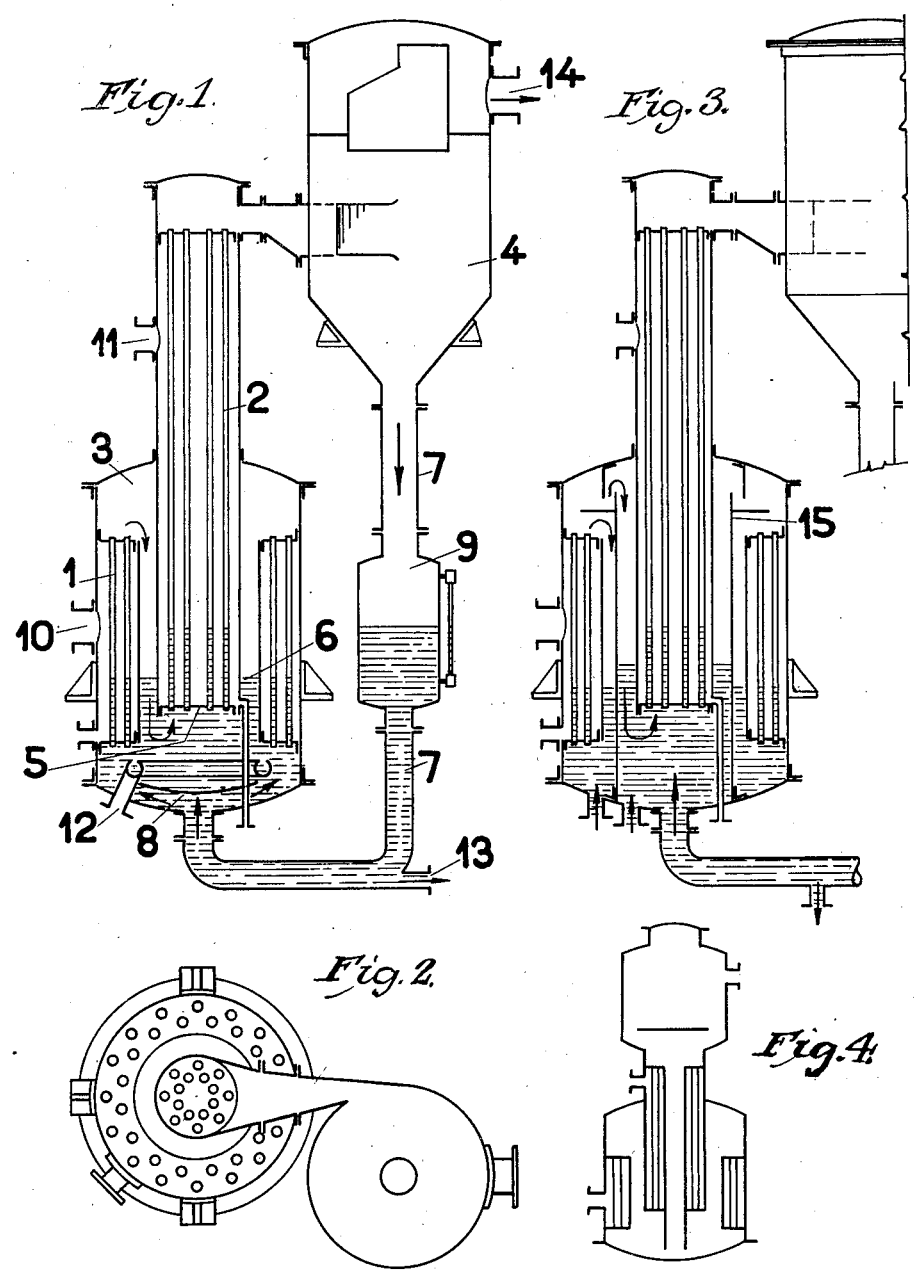
INVENTOR
ATTORNEYS Patented July 24, 1928.

1,677,987

UNITED STATES PATENT OFFICE.

ERMIN POKORNY, OF PRAGUE, CZECHOSLOVAKIA.

EVAPORATING APPARATUS.

Application filed January 4, 1927, Serial No. 159,009, and in Czechoslovakia January 16, 1926.

In evaporating devices of known type, movement of the liquid is produced by the lifting action of steam bubbles which are generated, and whilst a considerable velocity is attained when long tubes are used, such velocity only takes place in the upper part of the tubes, and the liquid in the lower part moves slowly and is little affected. The utilization of only a few tubes for the juice, does not materially alter the speed of the circulation. The use of a pump, to obtain a better circulation has not given satisfactory results.

According to the present invention, movement of the liquid is attained by reason of steam, emanating from a generator, lifting the liquid throughout the whole length of the tubes so that the liquid attains the same speed of the ascending steam. Three forms of apparatus are shown in the accompanying drawings in which:—

Figures 1, 3 and 4 show the apparatus in section, whilst Figure 2 is a plan in cross section of Figure 1.

According to the first constructional form (Figures 1 and 2) the evaporating body comprises an external heating chamber 1 surrounding an inner heating chamber 2; each evaporating chamber being independent of the other, and of two separated steam chambers 3 and 4, in the latter of which a juice catching device is arranged. The inner evaporating chamber 2 is arranged with respect to the evaporating chamber 1 in such manner that its lowermost end-piece 5 is at a higher level than the lower end of the chamber 1 and the liquid, which is to be evaporated, stands at such a level in the chamber 3 and tubes in the chambers 1 and 2 that it is above the lower extremities of both evaporating chambers and extends up to a certain height indicated by 6 in the drawings. The vapour, generated from the liquid in the steam chamber 1 is shut in, so that, proportionately to its increase in pressure, the liquid in the chamber 3 rises or falls and, in falling, rises in the chamber 2 and in the chamber 9 of the circulating pipe 7 which is in connection with the chamber 4. So soon as the steam generated has forced the level 6 of the juice down to the edge of the bottom 5, the steam penetrates into the tubes of the evaporating chamber 2 and raises the juice contained therein into the steam chamber 4, where the steam separates and escapes through the outlet 14, whilst the liquid falls through the circulation pipe 7 to the juice chamber 9, thence through the pipe 7 to the chamber 3, and impinging upon the deflector 8 passes into the tubes of the evaporating chamber 1. This process repeats itself very rapidly during continuous working.

In order to prevent the juice from rising too high in the tubes of the evaporating chamber 2, when the level 6 falls, the chamber 9 is of suitable diameter, the capacity compensating for the rise in the tubes of the chamber 2. To the vessel 9 there is affixed an indicator to show the level of the juice. If the level of the liquid keeps higher, then more juice will circulate and, its movement in the tubes can be observed.

Hot steam enters the heating chambers 1 and 2 through pipes attached at 10 and 11 to the apparatus. The juice enters the chamber 3 through a pipe attached to the apparatus at 12 and is withdrawn from the pipe 7, at 13.

As shown in Figure 4, the steam chamber 4 is arranged at a higher level than the evaporating chamber 2 and the pipe 7 can, if preferred, pass centrally through the chamber 2, but it must project below the bottom of the chamber.

The constructional form of the apparatus, according to Figure 3, is especially suitable for the evaporation of liquids which require a very rapid circulation. For this purpose a partition 15 is inserted in the chamber 3. Water or any other liquid which is to be inspissated can be evaporated in the steam chamber, and in the inner evaporating chamber there can be evaporated one liquid whilst another liquid which requires a rapid circulation and which is not harmed by aqueous vapours can be evaporated in the chamber 2.

The admission and outlet openings for the liquid are arranged accordingly.

A further advantage of this apparatus is that each of the two heating systems can, if necessary, be heated by steam of varying pressures.

What I claim and desire to secure by Letters Patent of the United States is:—

1. An evaporating apparatus comprising, in combination, an outer encompassing enclosed chamber, an enclosed annular heating chamber within and contiguous to the inner surface of the wall of the said outer chamber and including tubes extending vertically therethrough, a second heating chamber having vertically disposed tubes arranged centrally within said annular heating chamber, there being a space between said heating chambers, constituting open communication between the tubes in both heating chambers, said second heating chamber having its lower end positioned above the lower end of the annular heating chamber and its other end situated above said annular heating chamber and the top of the outer enclosed chamber, a steam and juice receptacle, means communicating said receptacle with said centrally disposed heating chamber, a juice container beneath said steam and juice receptacle and communicating with said steam and juice receptacle and with the lower end of the said outer encompassing chamber, said encompassing chambers and centrally disposed heating chambers having inlets for steam, and said outer encompassing chamber having an outlet for juice.

2. An evaporating apparatus, comprising, in combination, an outer encompassing enclosed chamber, an enclosed annular heating chamber within and contiguous to the inner surface of the wall of the said outer chamber and including tubes extending vertically therethrough, a second heating chamber having vertically disposed tubes disposed centrally within said annular heating chamber, there being a space between said heating chambers constituting open communication between the tubes in both heating chambers, a partition within said space forming compartments between said annular and centrally disposed heating chambers and having open communcation with each other at their upper ends, said second heating chamber having its lower end situated above the lower end of the annular heating chamber and its other end situated above said annular chamber and the top of the outer enclosed chamber, a steam and juice receptacle communicating with said centrally disposed heating chamber and having a steam outlet, a juice container beneath said steam and juice receptacle, means communicating said container with said juice and steam receptacle and with the lower end of the said encompassing chamber, said encompassing and centrally disposed heating chambers having inlets for steam, and said encompassing chamber having an outlet for juice.

ERMIN POKORNY.